United States Patent

Homma

[15] 3,697,967

[45] Oct. 10, 1972

[54] MAGNETIC THIN FILM MEMORY

[72] Inventor: Noriyuki Homma, Kokubunji, Japan

[73] Assignee: Hitachi, Ltd., Tokyo, Japan

[22] Filed: April 12, 1971

[21] Appl. No.: 133,124

[30] Foreign Application Priority Data

April 13, 1970 Japan ......................45/30840
Aug. 5, 1970 Japan ......................45/68468

[52] U.S. Cl. ...................... 340/174 CA, 340/174 LA, 340/174 PW, 340/174 DA, 340/174 DC, 340/174 PC

[51] Int. Cl. ............................G11c 11/14, G11c 5/02

[58] Field of Search ..340/174 DA, 174 PW, 174 PC, 340/174 QB; 330/69

[56] References Cited

UNITED STATES PATENTS 3,181,132 4/1965 Amemiya............340/174 DA
3,466,630 9/1969 Mayne et al. .......340/174 DA

OTHER PUBLICATIONS

International Solid-State Circuits Conference " Information Storage Techniques" Low Coercive Force Ferrite Ring Cores for a Fast Non-Destructively Read Store by Perry et al., Feb. 11, 1960 pages 58- 59

*Primary Examiner*—Stanley M. Urynowicz, Jr.
*Attorney*—Craig, Antonelli & Hill

[57] ABSTRACT

A magnetic thin film memory of the type in which one data line is commonly used as a sense line and a digit line, comprising a limiter including a diode bridge at a terminating point of a data line, thereby eliminating digit noises of large amplitude and enabling the use of regular read signal (i.e., "1" or "0") directly as the input for a sense amplifier.

4 Claims, 7 Drawing Figures

INVENTOR

NORIYUKI HOMMA

BY Craig, Antonelli & Hill
ATTORNEYS

INVENTOR

NORIYUKI HOMMA

BY Craig, Antonelli & Hill
ATTORNEYS

INVENTOR

NORIYUKI HOMMA

BY Craig, Antonelli & Hill

ATTORNEYS

MAGNETIC THIN FILM MEMORY

BACKGROUND OF THE INVENTION

Field of the Invention

This invention relates to a ferromagnetic thin film memory of the sense line-digit line co-use type, and more particularly to a memory having a feature at the terminating point of the memory, i.e., the input stage for a sense amplifier.

DESCRIPTION OF THE PRIOR ART

Figure 1:
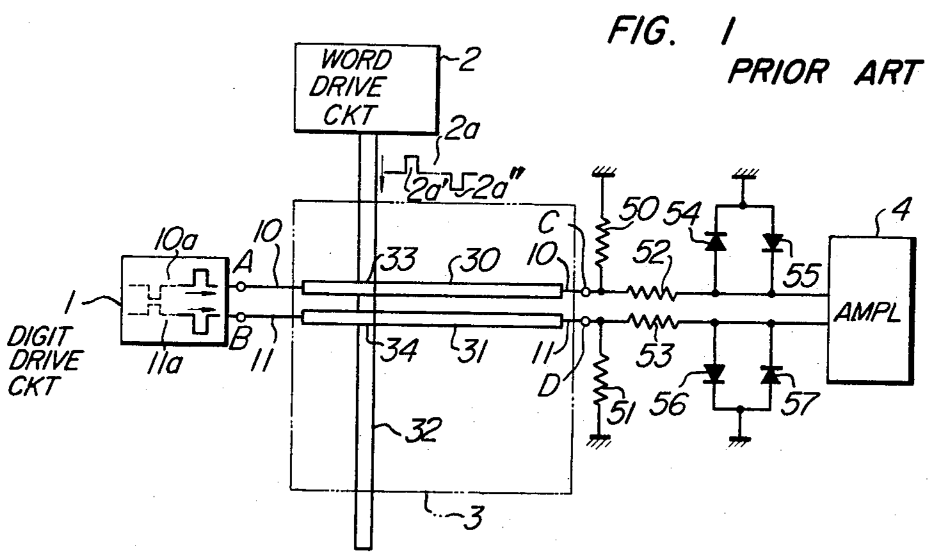
FIG. 1 PRIOR ART
FIG. 1 is a structural diagram of a prior art system.

In a ferromagnetic thin film memory, the magnetic output available from each cross point is small. Thus, 2 cross points/1 bit method has been adopted for increasing the output signal and preventing the deterioration of the signal to noise ratio S/N. In a memory in which one line is co-used as a sense line and a digit line (this line being referred as a data line hereinafter), a pair of lines is used for for one bit and a positive and a negative pulses in opposite phase relation are applied to these data lines as digit voltages to allow digit currents to flow. Since the magnitude of said digit voltages is usually 5 to 10 volts, a large current is allowed to flow through a digit line, i.e., data line, thereby applying a large voltage at the input terminal of a sense amplifier. Usually, such voltages appearing at the input terminal of a sense amplifier by the application of a digit voltage are undesirable and thus called digit noises. When such a digit noise is applied directly to a sense amplifier, the amplifier may be subjected to a break-down or otherwise is led to a saturation state and needs a long time to recover the normal operation state. converted subsequently for For improving these drawbacks, conventionally, clamp circuits comprising diodes may be provided at the input stage of a sense amplifier, as is shown in FIG. 1. In FIG. 1, numeral 3 indicates a memory plane and 30, 31 a pair of memory elements a rigid one bit. On said memory elements 30 and 31, a word line 32 is arranged to cross twice in vertical direction of the figure. The memory elements 30 and 31 are made of ferromagnetic material plated on data lines 10 and 11. Memory stored in the two cross points 33 and 34 of the word line 32 and the date lines 10 and 11 forms one bit of information. The date lines 10 and 11 are connected with a digit driving circuit 1 through input terminals A and B of the memory plane and supplied with digit voltages 10*a* and 11*a*, respectively therefrom. The word line 32 is connected with a word driving circuit 2 and supplied with a word voltage 2*a* therefrom. The word voltage 2*a* is formed of a read-out voltage 2*a'*, a write-in voltage 2*a''*. In write-in operation, digit voltages 10*a* and 11*a* are supplied simultaneously with the application of a word voltage 2*a''*. Terminating resistors 50 and 51 are connected to the output terminals C and B of the memory plane, respectively, for matching the impedance. Diodes 54, 55 and 56, 57 are connected to the output terminals C and D through balancing resistors 52 and 53, respectively, for clamping excess voltages which are otherwise supplied to a sense amplifier 4.

In the above structure in read-out operation, a word voltage 2*a'* is applied from the word driving circuit 2 through the word line 32 to read out the memory "1"or "0" stored in the two cross points 33 and 34. The voltage thus read out from the memory usually has a peak-to-peak value of about 20 mV. Thus in read-out operation, the output voltages take a value smaller than the threshold voltage of the champing diodes, and hence are applied to and read out in the sense amplifier 4 through the balancing resistors 52 and 53.

On the other hand, in write-in operation, a signal representing "1" or "0" is written in the cross points 33 and 34 by digit voltages 10*a* and 11*a* supplied through the input terminals A and B and a word voltage 2*a''*. Here, the voltages appearing at the output terminal of the digit driving circuit 1 have a value of 5 to 10 V, as is described before. These voltages are allowed to transmit through the memory plane 3 without any substantial extinction and appear at the output terminals C and D. The voltages thus appearing at the output terminals are then clamped by the clamping diodes 54, 55 and 56, 57 at their threshold value. By this clamping operation, a digit current flowing through the data line by the digit voltage achieves a predetermined purpose without being directly applied to the sense amplifier 4.

Such a conventional system, however, has the following drawbacks. First, the clamped voltage is invention; high, i.e., 0.3 to 0.5 V, being determined by the threshold voltage of the diodes. Next, since a large current is allowed to flow through a clamping diode, time required for recovery becomes long. Further, when the diode becomes conductive, the terminating resistance for the sense amplifier seen from the output terminals of the memory plane 3 is substantially equal to the conducting resistance of the diode (because the conductive resistance of the diodes is extremely small compared with the terminating resistances 50 and 51). For this reason, the balancing resistors 52 and 53 are provided These balancing resistors 52 and 53 have a value extremely larger than that of the terminating resistances 50 and 51. Thus, the terminating resistance is arranged not to substantially change even when any diode becomes conductive by a digit current.

In case where such a balancing resistance is selected to be large, however, in read-out operation an output voltage is inevitably divided by this resistance and hence supplies an extremely small input signal to the sense amplifier. On the other hand when such a balancing resistance is selected to be small or removed for eliminating said drawback, the terminating impedance is subjected to a far larger variation compared with the terminating resistors 52 and 53. Thereby, a digit current will be caused to repeat reflection and the time required for damping becomes notably large. Therefore, the memory cycle period is inevitably increased.

SUMMARY OF THE INVENTION

An object of this invention is to provide a memory in which the drawbacks of the conventional device have been eliminated.

Another object of this invention is to provide a memory which perfectly eliminates a digit noise when the digit noise is generated in the data line but transmits a regular signal (i.e., "1" or "0") to supply to a sense amplifier.

Further object of this invention is to provide a memory which has a shortened cycle time.

According to a feature of this invention, a limiter comprising diode bridge limiter is connected at the input stage of a sense amplifier.

DESCRIPTION OF THE PREFERRED EMBODIMENTS

Figure 2:
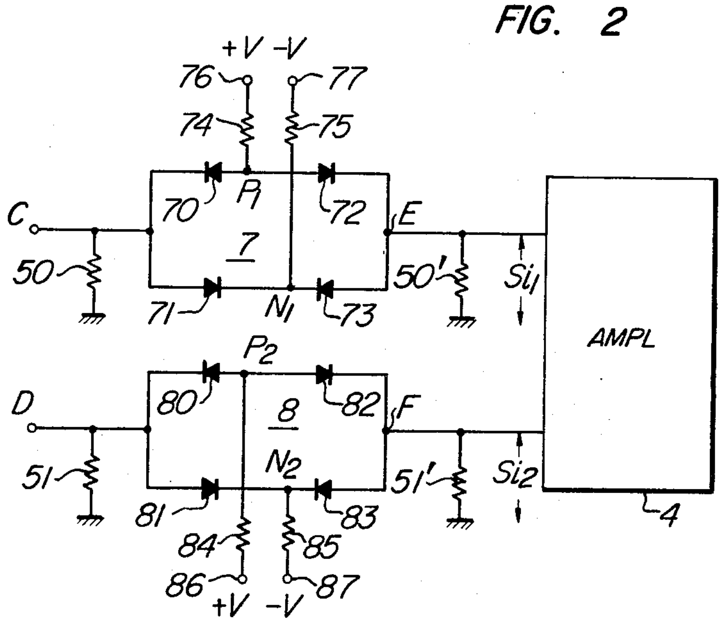
FIG. 2 is a structural diagram of a basis embodiment of this invention.

FIG. 2 shows a basic embodiment of this invention, which driving circuits and a memory plane as shown in FIG. 1 are not shown. A diode bridge limiter 7 comprises diodes 70, 71, 72 and 73 and resistors 74 and 75. To respective one ends 76 and 77 of the resistors 74 and 75, constant voltages of +V and −V are applied. Similarly, 8 comprises diodes 80, 81, 82 and 83 and resistors 84 and 85. And constant voltages of +V and −V are applied to respective one ends of the resistors 84 and 85. Letters $P_1$, $P_2$ and $N_1$, $N_2$ indicate anodes and cathodes. Resistors 50′ and 51′ form input resistors for the sense amplifier 4, respectively. In order to form a constant current source for allowing a constant minute current to flow through the diodes 70, 72 and 71, 73, the resistors 74 and 75 are selected to be sufficiently large compared with other resistances.

The voltages ±V applied to terminals 76 and 77 are selected to be sufficiently large compared with the digit voltages applied from the digit driving circuit. Further, arrangement is done to supply a relatively small current from these voltages ±V. The reason will be described later. When the digit voltage is 5 to 10 V and peak-to-peak voltage of the read-out output signal is about 20 mV as described before, the voltage V may be selected at about 20 V. The above description is also the case with the other diode bridge limiter 8.

In the state where no digit voltage is applied to the input terminals A and B, all the diodes 70 to 73 and 80 to 83 connected to the output terminals of the memory plane C and D are forced conductive. Here, plus-minus balancing is provided between the output terminals E and F of the limiters. Thus, output signal is zero. In this state, the anodes $P_1$ and $P_2$ are maintained at a very small positive voltage and the cathodes $N_1$ and $N_2$ at a very small negative voltage.

When a write-in operation starts in such a state, voltages corresponding to the digit voltage appear at the output terminals C and D of the memory plane 3. These voltages are assumed to be positive for the diode bridge limiter 7 and negative for the diode bridge limiter 8. On the other hand, the electrodes $P_1$ and $N_1$ are maintained at respective low voltages, therefore when said signals are applied to the bridge limiters 7 and 8, the diodes 70 and 81 are turned off, while the diodes 71 and 80 keep a similar conductive state as is before the application of the digit currents. Thus, the input digit voltages substantially appear at $N_1$ and $P_2$ and the diodes 73 and 82 are turned off. Therefore, under the application of the digit currents, conductive diodes in the bridge circuits 7 and 8 are only 72 and 83. A constant current is allowed to flow through the resistor 74 and apply to the input resistor 50′ by the voltage +V applied at the terminal 76 and hence generates an extremely small but constant voltage drop across said input resistor. This voltage exhibits a positive polarity for the sense amplifier. On the other hand, a constant current is allowed to flow through the resistor 85 and apply to the input resistor 51′ by the voltage −V applied at the terminal 87 and hence generates a voltage drop of negative polarity for the sense amplifier. Assuming that the circuit arrangements of the bridge limiters 7 and 8, and the digit currents 10 and 11 supplied from the memory 3 are of the same condition respectively, a voltage of 2 $V_{st}$ is applied across the input terminals of the sense amplifier 4, designating voltage drop by the input resistor 50′ be + $V_{st}$. Now, letting the voltage applied to the terminals 76, 77, 86 and 87 be ±20 V, the resistances 74, 75, 84 and 85 be 32 KΩ and the input resistances 50′ and 51′ be 1 KΩ, the currents I flowing into the input resistor 50′ and 51′ become respectively about 0.62 mA. In this calculation, however, the effects of the diodes are neglected. Thus, voltages of ±0.62 V are generated across the input resistors 50′ and 51′, respectively, and hence only a very low voltage of 1.24 V is applied to the sense amplifier 4.

In read-out operation, the memory plane 3 generates a low voltage of several tens millivolts. In such cases, all the diodes of the bridge circuits 7 and 8 remain to be conductive. Thus the voltages appearing at the terminals C and D are transmitted to the input terminals of the sense amplifier 4 without any appreciable decrease.

Figure 4:
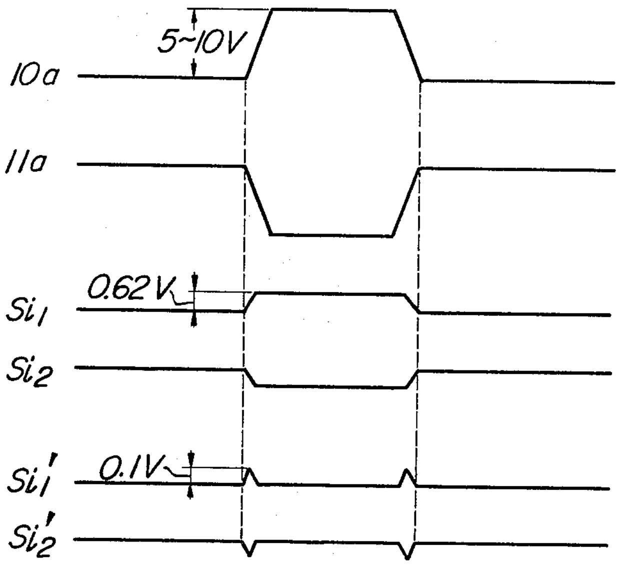
FIG. 4 illustrates the operation of the embodiments of FIGS. 2 and 3.

FIG. 4 schematically shows the waveforms in the above operation, in which digit voltages are represented by 10*a* and 11*a* and the input voltages to the sense amplifier, i.e., voltages generated across the input resistors 50′ member 51′, are represented by $S_{i1}$ and $S_{i2}$.

Comparison of the terminating resistance will be done between the case when an input signal current of such a large amplitude that turns folds the bridge limiter is applied and the case when an input signal current of such a small amplitude that keeps the bridge circuit conductive is applied. In the case of currents of large amplitude, bridge limiters 7 and 8 are respectively turned off and thus the terminating resistances are respectively those of 50 and 51, whereas in the case of small amplitude, the bridge limiters 7 and 8 are conductive and the terminating resistances are determined by the resitors 50, 50′ and 51, 51′ respectively, neglecting the diode resistances. Since the resistances 50′ and 51′ are selected to be sufficiently larger than the resistances 50 and 51, the terminating resistances are mainly determined by the resistances 50 and 51. Particularly in case where the input signals are of small amplitude, even though the resistances 50′ and 51′ give influence to the total terminating resistances, i.e., when the resistances 50′ and 51′ are of a value non-negligible compared with the terminating resistances 50 and 51, it does not directly means that the matching condition is not satisfied. Namely, the substantial terminating resistances can be considered invariable without regard to the amplitude of the input signals to the bridge limiters 7 and 8. In the above description, by the term "current of large amplitude" is meant a digit current and by "current of small amplitude" a read-out output signal. But it is apparent that said currents are not limited to those.

Figure 3:
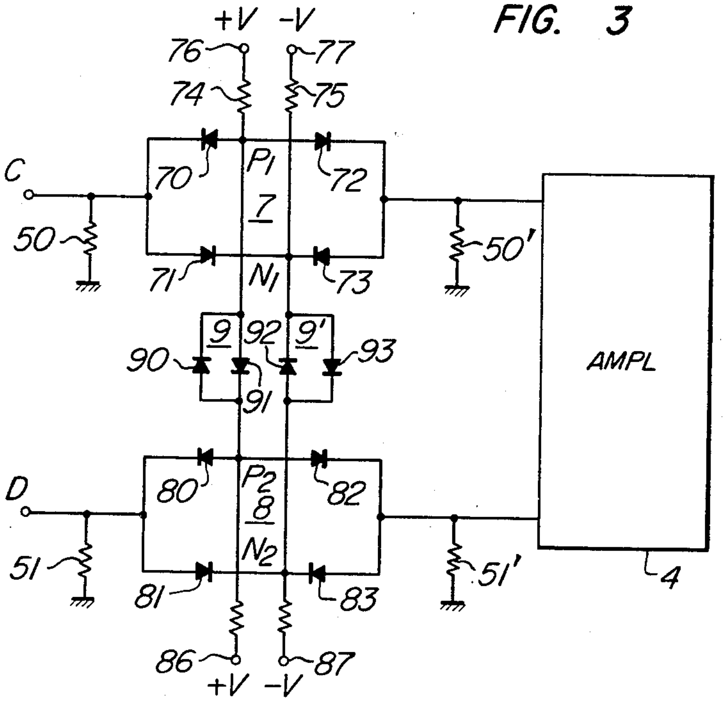
FIG. 3 shows a this invention.

FIG. 3 shows an embodiment for further decreasing the digit current. The feature of this embodiment lies in the provision of a diode circuits 9 and 9' between the diode bridge limiters 7 and 8 in the circuit of FIG. 2. This interconnecting circuit may be of any kind provided that it becomes conductive for voltage of both polarity but larger than a certain threshold value. In this embodiment, it is composed of diodes. A diode circuit 9 comprises diodes 90 and 91 connected in parallel but in opposite polarity and another diode circuit 9' comprises similar diodes 92 and 93. These diode circuits work as follows. When a positive and a negative pulses appear at $N_1$ and $P_2$ by the application of digit voltages to the terminals C and D and when the voltage of these pulses exceeds the threshold voltage $V_{th}$ of the diode circuits, said diode circuits transmit pulses at $N_1$ and $P_2$ to $N_2$ and $P_1$, respectively, and hence turn off the diodes 82 and 72. Thus, when large signals are applied, output voltages appear at the output terminals of the circuit of FIG. 3, only when the applied voltages lie between 0 and $V_{the}$ in the rise and fall time of the large signals and never appear at other instances. Assuming the rise or fall time of an applied signal be 10 n sec, the width of a spike becomes about 0.5 n sec. Practically, the spike width becomes about 5 n sec due to floating capacitance, etc., and the amplitude becomes about 0.07 V. It will be appearent that the threshold voltage is preferably as small as possible provided that it is above the read-out signal (about ±10 mV).

Such inputs to the sense amplifier in the circuit of FIG. 3 are shown in FIG. 4 as $S_{i1}$ and $S_{i2}$. As can be seen from FIG. 4, according to the circuit arrangement of FIG. 3 the output voltages of the memory plane take pulse like waveforms in the rise and fall time of the digit voltages. Therefore, the circuit arrangement of FIG. 3 has increased the reliability compared with that of FIG. 2.

As is appearent from the foregoing description, according to this invention in response to write-in noises of large amplitude such as digit voltages the circuit arrangement forms minute and constant output voltages with no regard to the magnitude of said noises, thereby preventing the application of large voltages to the inputs of a sense amplifier and protecting the sense amplifier, and also enabling a reduction in the recovery time from saturation state of a sense amplifier so as to achieve a shortening of the memory cycle. Further, such a conventional drawback can also be eliminated according to this invention that the terminating conditions for matching varies according to the existence of a noise and hence that the memory cycle period is elongated.

Figure 5:
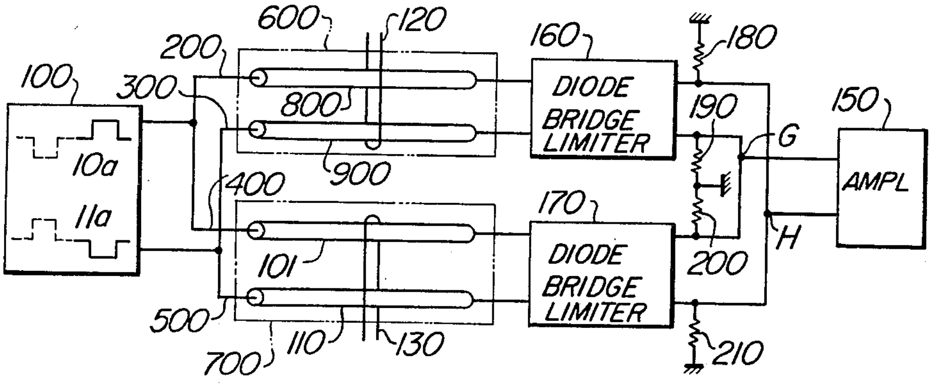
FIG. 5 shows another embodiment of this invention.
Figure 6A:
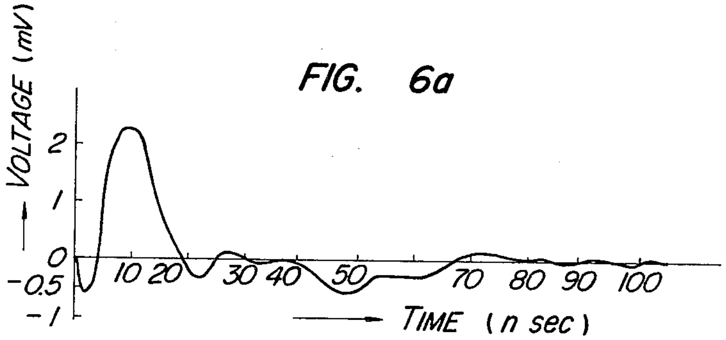
FIGS. 6*a* and 6*b* illustrate the operation of the embodiment of FIG. 5.
Figure 6B:
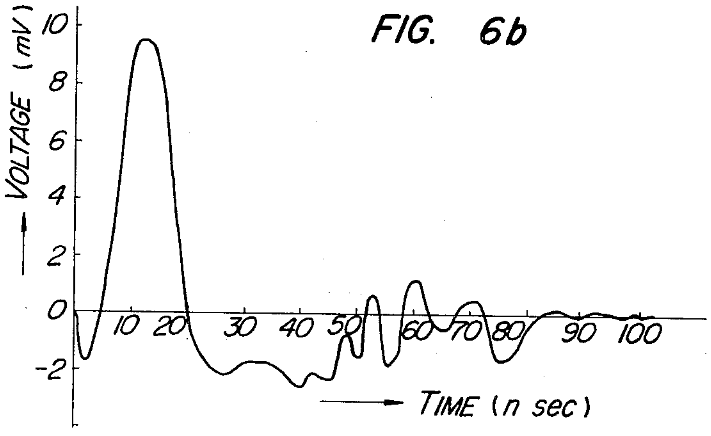

The foregoing embodiments can be applied to such conventional systems which comprise an upper and a lower stacks which are balanced to eliminate the digit noise. In such a system, arrangement is done that the digit voltages cancel out between the upper and the lower stack and thus the digit noises should naturally be cancelled out. But practically the elimination of noises could not be achieved sufficiently. The main reason lies in the difficulty for realizing the same conditions for the data lines in the upper and the lower stack (for example, due to floating capacitances, noise levels induced from other lines). Therefore, generation of digit noises up to a certain level could not be eliminated. For improving such a drawback, there is proposed such systems provided with a diode clamp circuit at the termination of a data line as shown in FIG. 1. In such improved systems too, about 10 percent of unbalances exist in the industrial products. For example, letting the digit voltages be 5 V, digit noises of about 0.5 V are generated. On the other hand the clamp level of a diode clamp circuit is of the order of 0.3 to 0.6 V. Thus, a voltage of at least about 0.3 V can be applied to a sense amplifier in write-in operation, whereas the read-out output in read-out operation is about 10 mV. Therefore, a considerable time period is required for a sense amplifier to recover to a readable state after the application of at least 0.3 V in write-in operation and it hardly goes below about 300 n sec even with various modifications or alternations. An improvement in such a conventional system is shown in FIG. 5.

In the figure, from a digit driving circuit 100 are connected data lines 200, 300, 400 and 500. An upper stack 600 and a lower stack 700 comprise respective memory elements 800, 900, and 101, 110 with word lines 120 and 130 crossing the respective memories. Diode bridge limiters 160 and 170 as those of FIG. 2 are connected between respective stacks and a sense amplifier 150. The sense amplifiers are provided with input resistors 180, 190, 200 and 210. In write in operation, for example a positive digit voltage is applied to the data lines 200 and 400 and a negative digit voltage is applied to the data lines 300 and 400. Simultaneously, a word signal is allowed to flow through a word line 120 or 130. As a result, a desired signal "1" or "0" is written in the memories 800 and 900 of the upper stack 600 or in the memories 101 and and 110 of the lower stack. In read-out operation, a read-out signal is sent along a word line 120 or 130 to read out some desired bit.

In the above structure, if there are no bridge limiters 160 and 170 and when digit voltages are applied to the data lines 200, 400 and 300, 500, signals of opposite polarity flowing through the data lines 200 and 500 should cancel each other at the point H and similarly signals of opposite polarity flowing through the data lines 300 and 400 should also cancel each other at the point G, therefore the input to the sense amplifier should be zero. But as is described before, voltages at the connection point G of the data lines 200 and 500 and at point H of the data lines 300 and 400 may not become zero and further may not be of the same magnitude, therefore a digit noise may be applied to the input terminals of the sense amplifier 150. When the bridge limiters 160 and 170 are provided, the data lines 200 and 300 of the upper stack 600 and those 400 and 500 of the lower stack 700 are clamped by the respective bridge limiters 160 and 170. Then the digit noises are arranged to add at the points G and H so that they can be substantially perfectly eliminated. Further when bridge limiters as shown in FIG. 3 are used at 160 and 170, only spike shaped pulse voltages of an amplitude less than 0.1 V and a width less than 10 n sec can appear in the respective bridge limiters at the rise and fall time of the digit noises, achieving improved effect.

FIGS. *6a* and *6b* show noise voltage waveforms when bridge limiter of FIG. 3 are used as the bridge limiters which appear at the input terminals of the sense amplifier when digit pulse voltages are applied in write-in operation. The waveform of FIG. *6a* is obtained with such an upper and a lower stacks which are well balanced that digit pulse voltages of 5 V can be reduced to 0.1 V only by balancing. In this case, unbalance component is 2.3 mV according to the balancing system of this invention. The waveform of FIG. *6b* is obtained with such an upper and a lower stacks which are poorly balanced that digit voltages of 5 V can only be reduced to 0.8 V only by balancing. Even in this case, the unbalance component can be reduced to the order of 10 mV by using the inventive system as can be seen from the figure.

According to the arrangements of the embodiments, even when digit pulses of 5 manufacture 10 V is applied, voltages of only 10 mV can appear at the input terminals of the sense amplifier, while the output in read-out operation is also of 10 mV. Thus, only voltages of about 10 mV are applied to the sense amplifier both in read-out and write-in operation, therefore there is no need for the consideration to the recovery time of the sense amplifier and hence the design of a sense amplifier becomes much easier. Conventionally, a d.c. amplifier is always adopted as a sense amplifier for reducing the recovery time. But according to this invention, a much chieper a.c. amplifier can be adopted and the problem of off-set can also be solved altogether. The time period from a write-in to the next read-out can be reduced below 100 n sec.

I claim.

1. In a ferromagnetic thin film memory comprising a memory plane including a plurality of word lines, a plurality of data lines plated with magnetic thin film and arranged in matrix form with said word lines, one bit information being stored in two cross points of a word line and a first and a second data lines; means for applying digit signals of same phase but opposite polarity to said first and second data lines; a first and a secone input terminals connected to said first and second data lines; and a sense amplifier for differentially detecting the signals applied to said first and second terminals, an improvement comprising a first and a second diode bridge limiters provided between said first and second input terminals of the sense amplifier and said first and second data lines, each of said bridge limiter having such characteristic that the bridge shuts off a pulse signal from the data line when the signal has a larger amplitude than that of an output read-out signal from a magnetic cross point and transmits a pulse signal when the signal is not larger than the output read-out signal.

2. An improvement in a ferromagnetic thin film memory according to claim 1, comprising a diode clamp circuit provided between said first and second bridge limiters and having such a threshold value that the clamp circuit turns off said bridge limiters when input signals larger than the lever of the output read-out signal is applied and exceeds the threshold value of the clamp circuit.

3. An improvement in a ferromagnetic this film memory according to claim 1, wherein said memory plane comprises an upper and a lower stack, each stack being provided with said bridge circuits, and the outputs of the first bridge limiter of the upper stack and the second bridge limiter of the lower stack are additively connected and then supplied to the sense amplifier and the outputs of the second bridge limiter of the upper stack and the first bridge circuit of the lower stack are additively connected and then supplied to the sense amplifier.

4. An improvement in a ferromagnetic thin film memory according to claim 3, further comprising a first diode clamp circuit connected between said first and second diode bridge limiters of the upper stack and a second diode clamp circuit connected between said first and second diode limiters stack, each of said diode clamp circuits turning off said diode bridge limiters when an input larger than the level of the output read-out signal is applied and exceeds the threshold value of the clamp circuit.

* * * * *